US012802207B2

(12) United States Patent
Tu et al.

(10) Patent No.: US 12,802,207 B2
(45) Date of Patent: Nov. 17, 2026

(54) ELECTRODE PLATE DETECTION APPARATUS, METHOD AND SYSTEM

(71) Applicant: CONTEMPORARY AMPEREX TECHNOLOGY (HONG KONG) LIMITED, Hong Kong (CN)

(72) Inventors: Yinhang Tu, Ningde (CN); Yunfei Ma, Ningde (CN); Kunpeng Cui, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 221 days.

(21) Appl. No.: 18/641,523

(22) Filed: Apr. 22, 2024

(65) Prior Publication Data

US 2024/0265526 A1 Aug. 8, 2024

Related U.S. Application Data

(63) Continuation of application No. PCT/CN2022/103122, filed on Jun. 30, 2022.

(51) Int. Cl.

| | |
|---|---|
| ***G06T 7/00*** | (2017.01) |
| ***G01N 21/88*** | (2006.01) |
| ***G06T 7/62*** | (2017.01) |

(52) U.S. Cl.
CPC ................ *G06T 7/001* (2013.01); *G06T 7/62* (2017.01)

(58) Field of Classification Search
CPC ........... G06T 7/001; G06T 7/62; Y02E 60/10; G01N 21/88
USPC .......................................................... 382/141
See application file for complete search history.

(56) References Cited

FOREIGN PATENT DOCUMENTS

| | | |
|---|---|---|
| CN | 101349652 A | 1/2009 |
| CN | 202362253 U | 8/2012 |
| CN | 103884650 A | 6/2014 |
| CN | 206038548 U | 3/2017 |
| CN | 109001118 A | 12/2018 |
| CN | 109613000 A | 4/2019 |
| CN | 109741323 A | 5/2019 |

(Continued)

OTHER PUBLICATIONS

Extended European Search Report for EP application No. 22948616.2, dated Jan. 15, 2025.

(Continued)

*Primary Examiner* — Jennifer Mehmood
*Assistant Examiner* — Dustin Bilodeau
(74) *Attorney, Agent, or Firm* — Ladas & Parry LLP

(57) ABSTRACT

An electrode plate detection apparatus, method and system are disclosed. The electrode plate detection apparatus includes a detection module and a first image acquisition module. The first image acquisition module is configured to acquire images of different coating regions on an electrode plate, and send the images of the different coating regions to the detection module. The detection module is configured to detect the electrode plate according to the images of the different coating regions. As the first image acquisition module can be configured to implement the acquisition of the images of the different coating regions on the electrode plate, compared with the need to use different image acquisition modules for different coating regions, the number of the image acquisition modules can be reduced, thereby reducing the cost of the electrode plate detection apparatus.

18 Claims, 5 Drawing Sheets

(56) References Cited

FOREIGN PATENT DOCUMENTS

| | | | | | |
|---|---|---|---|---|---|
| CN | 110132980 | A | | 8/2019 | |
| CN | 110146505 | A | | 8/2019 | |
| CN | 110501341 | A | | 11/2019 | |
| CN | 111681241 | A | | 9/2020 | |
| CN | 212113887 | U | | 12/2020 | |
| CN | 112215825 | A | | 1/2021 | |
| CN | 112810467 | A | | 5/2021 | |
| CN | 113313711 | A | * | 8/2021 | ............... G06T 7/66 |
| CN | 113592845 | A | * | 11/2021 | ......... G06F 18/2415 |
| CN | 216066050 | U | * | 3/2022 | |
| CN | 114965508 | A | | 8/2022 | |
| JP | 2018113199 | A | | 7/2018 | |
| JP | 2019002888 | A | | 1/2019 | |
| JP | 6616339 | B2 | | 12/2019 | |
| WO | WO-2011145210 | A1 | * | 11/2011 | ............... H04N 7/18 |

OTHER PUBLICATIONS

International Search Report for PCT application No. PCT/CN2022/103122, dated Mar. 30, 2023.

Written Opinion of International Searching Authority for PCT application No. PCT/CN2022/103122, dated Mar. 30, 2023.

First Office Action of CN application No. 202280054336.9, dated Jun. 19, 2026.

First Office Action of EP application No. 22948616.2, dated Jul. 31, 2026.

* cited by examiner

ELECTRODE PLATE DETECTION APPARATUS, METHOD AND SYSTEM

CROSS REFERENCE TO RELATED APPLICATION

This application is a continuation of International Patent Application No. PCT/CN2022/103122, filed on Jun. 30, 2022, which is incorporated by reference in its entirety.

TECHNICAL FIELD

The present application relates to the field of battery manufacturing technologies, in particular to an electrode plate detection apparatus, method and system.

BACKGROUND

The quality of a battery electrode plate is one of important factors affecting the performance of a battery, and therefore, in a battery production process, before the battery electrode plate is wound or laminated, quality detection needs to be performed thereon.

A battery electrode plate includes film areas and coating areas, the film areas are formed by coating a positive electrode active material or a negative electrode active material on a current collector, and the coating areas are formed by coating an insulating material (for example, ceramic) on the current collector. In the prior art, an electrode plate detection apparatus uses an image collector to perform image acquisition on the film areas so as to obtain film area images, uses another image collector to perform image acquisition on the coating areas so as to obtain coating area images, and uses the obtained film area images and coating area images to detect the electrode plate. Therefore, the cost of the conventional electrode plate detection apparatus is high.

SUMMARY

An objective of the embodiments of the present application is to provide an electrode plate detection apparatus, method and system, so as to reduce the cost of the electrode plate detection apparatus.

According to a first aspect, an embodiment of the present application provides an electrode plate detection apparatus, including: a detection module and a first image acquisition module, wherein the first image acquisition module is configured to acquire images of different coating regions on an electrode plate, and send the images of the different coating regions to the detection module; and the detection module is configured to detect the electrode plate according to the images of the different coating regions.

In the embodiment of the present application, as the first image acquisition module can be configured to implement acquisition of the images of the different coating regions on the electrode plate, compared with the need to use different image acquisition modules for different coating regions in the prior art, the embodiment of the present application can reduce the number of the image acquisition modules, thereby reducing the cost of the electrode plate detection apparatus.

In any embodiment, the images of the different coating regions include a first film area image and a first coating image of a first surface of the electrode plate.

In the embodiment of the present application, the first film area image and the first coating image of the first surface of the electrode plate can be obtained by means of one first image acquisition module, so that the number of image acquisition modules used in the electrode plate detection apparatus is relatively small, and the cost thereof is low.

In any embodiment, the first image acquisition module acquires the first film area image and the first coating image of the first surface of the electrode plate by means of a time-division exposure method, and the time-division exposure method refers to performing image acquisition at different time points by using different exposure parameters.

In the embodiment of the present application, the first image acquisition module acquires the first film area image and the first coating image by means of the time-division exposure method, thereby implementing image acquisition of a film area and a coating area on one of the surfaces of the electrode plate by using an image acquisition module, so that the number of the image acquisition modules is reduced, thereby further reducing the cost of the electrode plate detection apparatus.

In any embodiment, the electrode plate detection apparatus further includes a second image acquisition module in communication connection with the detection module; the second image acquisition module acquires a second film area image and a second coating image of a second surface of the electrode plate by means of a time-division exposure method, and sends the second film area image and the second coating image to the detection module; and the detection module is configured to perform quality detection on the second surface of the electrode plate according to the second film area image and the second coating image.

In the embodiment of the present application, the second image acquisition module can implement image acquisition of a film area and a coating area by means of time-division exposure, and therefore, image acquisition of the film areas and the coating areas on both surfaces of the electrode plate can be implemented by means of the first image acquisition module and the second image acquisition module, thereby reducing the cost of the electrode plate detection apparatus.

In any embodiment, the electrode plate detection apparatus further includes a third image acquisition module in communication connection with a detection module, the third image acquisition module is configured to acquire a tab image and send the tab image to the detection module; and the detection module is configured to perform quality detection on a tab on the electrode plate according to the tab image.

In the embodiment of the present application, the third image acquisition module is configured to perform image acquisition on the tab, so that it can be determined whether a size of the tab meets a requirement and whether the tab has a defect, thereby achieving quality detection of the electrode plate.

In any embodiment, the first image acquisition module includes a first image collector and a first light source, the first light source performs exposure twice with different intensities according to a first exposure time and a first exposure time interval, and the first image collector performs image acquisition on the electrode plate during exposure of the first light source, so as to obtain the first film area image and the first coating image.

In the embodiment of the present application, the first light source performs time-division exposure, and the first image collector performs image acquisition each time the first light source performs exposure, so that the first film area image and the first coating image can be obtained. One image acquisition module is used to implement image acquisition of two areas, and the acquired images have a good imaging effect.

In any embodiment, the first exposure time is shorter than a time for the first image collector to scan a line, and the first exposure time interval is determined according to a line frequency of a standard camera and a line frequency corresponding to the first image collector.

In the embodiment of the present application, by setting the first exposure time and the first exposure time interval of the first image collector, the first image collector can complete the image acquisition of the film area and the coating area in a relatively short time.

In any embodiment, the second image acquisition module includes at least one submodule, and each of the submodules is configured to acquire a second film area image and a second coating image of a corresponding segmented electrode plate.

The electrode plate detection apparatus provided in the embodiment of the present application is applicable to a one-into-N scenario during segmentation of the electrode plate.

Each submodule corresponds to one segmented electrode plate, so that film areas and coating areas of the second surfaces of all segmented electrode plates can be detected.

In any embodiment, each submodule includes a second image collector and a second light source; and the second light source performs exposure twice with different intensities according to a second exposure time and a second exposure time interval, and the second image collector performs image acquisition on the electrode plate during the exposure of the second light source, so as to obtain a second film area image and a second coating image of the corresponding segmented electrode plate.

In the embodiment of the present application, each submodule acquires images of a film area and a coating area of the second surface of the segmented electrode plate by means of a time-division exposure method, thereby reducing the number of submodules and reducing the cost of the electrode plate detection apparatus.

In any embodiment, the second exposure time is shorter than a time for the second image collector to scan a line, and the second exposure time interval is determined according to a line frequency of a standard camera and a line frequency corresponding to the second image collector.

In the embodiment of the present application, by setting the second exposure time and the second exposure time interval, the second image collector can complete the image acquisition of the film area and the coating area in a relatively short time.

In any embodiment, the detection module is specifically configured to perform size measurement and defect detection on the first coating image and/or the second coating image respectively after receiving the first coating image and/or the second coating image.

In the embodiment of the present application, by performing defect detection on the first coating image and/or the second coating image, it is determined whether a first coating and/or a second coating have a defect.

In any embodiment, the detection module is further configured to send a die-cutting deviation correction signal to a die-cutting deviation correction apparatus in a die-cutting process system if it is determined that there is a coating deviation according to a first coating size and/or a second coating size.

In the embodiment of the present application, if the detection module determines that there is a coating size deviation, the die-cutting deviation correction signal is sent to the die-cutting deviation correction apparatus, so that a size of a first coating area meets the requirement, so as to guarantee the quality of the electrode plate.

In any embodiment, the detection module is specifically configured to perform size measurement and defect detection on the first film area image and/or the second film area image respectively after receiving the first film area image and/or the second film area image, so as to obtain a first film area size corresponding to the first film area image and/or a second film area size corresponding to the second film area image and a defect position.

In the embodiment of the present application, the sizes of the first film area image and/or the second film area image are measured to determine whether the sizes of the first film area image and/or the second film area image meet the requirement.

In any embodiment, the detection module is further configured to send a slitting deviation correction signal to a slitting deviation correction apparatus in a die-cutting process system when it is determined that there is a film area deviation according to the first film area size and the second film area size.

In the embodiment of the present application, if the detection module determines that there is a film area size deviation, slitting deviation correction information is sent to the slitting deviation correction apparatus, so as to ensure that the film area size of the segmented electrode plate meets the requirement.

In any embodiment, the detection module is specifically configured to perform tab size measurement on the tab image and/or performing defect detection on the tab image after receiving the tab image, and marking a defect position.

The embodiments of the present application provide functions of measuring the size of the tab and identifying the tab defect.

According to a second aspect, an embodiment of the present application provides an electrode plate detection method, which is applied to a detection module, and the method includes: receiving images of different coating regions of an electrode plate acquired by a first image acquisition module; and detecting the images of the different coating regions to obtain a first detection result of the electrode plate.

In the embodiment of the present application, as the first image acquisition module can acquire the images of the different coating regions on the electrode plate, and then detection is performed according to the acquired images of the different coating regions, so as to reduce the cost of electrode plate detection.

On the basis of the described embodiment, the receiving images of different coating regions of an electrode plate acquired by a first image acquisition module includes: receiving a first film area image and a first coating image of a first surface of the electrode plate acquired by the first image acquisition module by means of a time-division exposure method.

In the embodiment of the present application, the first image acquisition module acquires the first film area image and the first coating image by means of the time-division exposure method, thereby implementing image acquisition of a film area and a coating area on one of the surfaces of the electrode plate by using one image acquisition module, so that the number of image acquisition modules is reduced, thereby further reducing the cost of an electrode plate detection apparatus.

In any embodiment, the method further includes: receiving a second film area image and a second coating image of a second surface of the electrode plate acquired by a second image acquisition module, the second film area image and the second coating image being acquired by the second image acquisition module by means of a time-division exposure method; and performing film area size measurement on the second film area image, and performing coating defect detection on the second coating image, so as to obtain a second detection result of the electrode plate.

In the embodiment of the present application, the second image acquisition module can implement image acquisition of a film area and a coating area by means of time-division exposure, and therefore, image acquisition of the film areas and the coating areas on both surfaces of the electrode plate can be implemented by means of the first image acquisition module and the second image acquisition module, thereby reducing the cost of the electrode plate detection apparatus.

In any embodiment, the method further includes: receiving a tab image acquired by a third image acquisition module; and performing tab size measurement on the tab image, so as to obtain a third detection result of the electrode plate.

In the embodiment of the present application, the third image acquisition module is configured to perform image acquisition on the tab, so that it can be determined whether a size of the tab meets the requirement and whether the tab has a defect, thereby achieving quality detection of the electrode plate.

In any embodiment, after obtaining the first detection result of the electrode plate, the method further includes: if the first detection result and the second detection result indicate that there is a coating size deviation, sending a die-cutting deviation correction signal to a die-cutting deviation correction apparatus in a die-cutting process system.

In the embodiment of the present application, the die-cutting deviation correction signal is sent to the die-cutting deviation correction apparatus, so that a size of the coating areas meets the requirement, thereby guaranteeing the quality of the electrode plate.

In any embodiment, after obtaining the first detection result and the second detection result of the electrode plate, the method further includes:

- if the first detection result and the second detection result indicate that there is a film area size deviation, sending a slitting deviation correction signal to a slitting deviation correction apparatus in a die-cutting process system.

In the embodiment of the present application, if the detection module determines that there is a film area size deviation, the slitting deviation correction signal is sent to the slitting deviation correction apparatus, so as to ensure that a size of a segmented electrode plate meets the requirement.

According to a third aspect, an embodiment of the present application provides an electrode plate production system, including a die-cutting process system and the electrode plate detection apparatus of the first aspect.

Additional features and advantages of the present application are illustrated in the following specification, which partially will be obvious from the specification, or may be learned by implementation of the embodiments of the present application. The objective and other advantages of the present application may be achieved and obtained by the structure particularly pointed out in the written specification, claims, and drawings.

BRIEF DESCRIPTION OF DRAWINGS

To describe the technical solutions in the embodiments of the present application more clearly, the accompanying drawings required for describing the embodiments of the present application are briefly introduced as follows. It should be understood that the following drawings only illustrate certain embodiments of the present application, and therefore should not be considered as limitations to the scope. For a person of ordinary skill in the art, other related drawings may also be obtained according to these drawings without any inventive effort.

DETAILED DESCRIPTION

Figure 1:
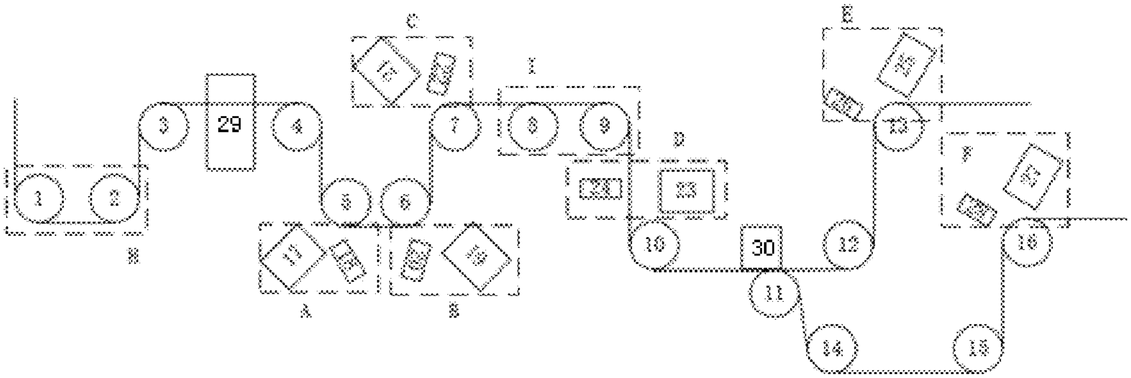
FIG. 1 is a schematic structural diagram of a current electrode plate detection apparatus.

The embodiments of the technical solutions of the present application are described in detail as follows with reference to the accompanying drawings. The following embodiments are only intended to describe the technical solutions of the present application more clearly, and therefore are only examples, but are not intended to limit the scope of protection of the present application.

Unless defined otherwise, all technical and scientific terms used herein have the same meaning as commonly understood by a person skilled in the art to which the present application belongs. The terms used herein are for the purpose of describing the specific embodiments of the present application only and are not intended to limit the present application. The terms “comprising” and “having” and any variations thereof in the specification, claims, and drawings of the present application, are intended to cover a non-exclusive inclusion.

In the description of the embodiments of the present application, the technical terms “first”, “second”, etc. are only used for distinguishing different objects, and cannot be understood as indicating or implying relative importance or implicitly indicating the number, a specific order or a primary relationship of indicated technical features. In the description of the embodiments of the present application, “a plurality of” means two or more unless specified otherwise.

Reference herein to “embodiments” means that particular features, structures, or characteristics described in combination with the embodiments can be included in at least one embodiment of the present application. The phrase appearing at each position of the specification does not necessarily indicate the same embodiments and it is not an exclusively independent or alternative embodiment of other embodiments. It is explicitly and implicitly understood by those skilled in the art that the embodiments described herein can be combined with other embodiments.

In the description of the embodiments of the present application, the term "and/or" is only used for describing the association relationship of the associated objects and indicates that three relationships may exist, for example, A and/or B may indicate: only A exists, A and B exist at the same time, and only B exists. In addition, the character "/" in this description generally indicates an "or" relationship of the associated objects.

In the description of the embodiments of the present application, the term "a plurality of" refers to two or more (including two), and by the same reasoning, "a plurality of groups" refers to two or more groups (including two groups), and "a plurality of pieces" refers to two or more pieces (including two pieces).

In the description of the embodiments of the present application, the orientation or position relationships indicated by the technical terms "center", "longitudinal", "lateral", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. are the orientation or position relationships shown in the drawings, which are only for the convenience of describing the embodiments of the present application and simplifying the description, rather than indicating or implying that the indicated device or element must have a specific orientation, or be constructed and operated in a specific orientation. Therefore, these technical terms should not be understood as limitations to the embodiments of the present application.

In the description of the embodiments of the present application, unless specified or defined otherwise, the technical terms such as "mount", "connect", "connected" and "fix" should be understood broadly, for example, "connect" may be fixed connection, detachable connection, or integral connection, may also be mechanical or electrical connection, may also be direct connection or indirect connection by means of an intermediate medium, and may also be inner communications of two elements or interaction relationships between two elements. A person of ordinary skill in the art may understand the specific meanings of the described terms in the embodiments of the present application according to specific situations.

Currently, in a production process of a battery electrode plate, in order to ensure that quality of a produced electrode plate meets a usage requirement and ensure safety of a battery, a detection node is provided in each step of the production process, for example, after coating and rolling the battery electrode plate, die cutting and slitting need to be performed on the battery electrode plate, wherein the die cutting refers to using a laser knife to cut out a tab, and slitting refers to segmenting a wide electrode plate into a plurality of narrow electrode plates. In this process, it is necessary to detect different coating regions on the electrode plate, for example, detecting areas coated with an active material and areas coated with an insulating material, so as to determine whether the described two areas meet the production requirements.

For convenience of description, in the present application, one coating area on an electrode plate is referred to as a film area, and the other coating area is referred to as a coating area. As the materials used for forming the film area and the coating area are different, when the same light source irradiates the two areas, the imaging effects of the two areas cannot be illuminated to an ideal state. For example, the gray scale value of the film area at the ideal state is 100 and the gray scale value of the coating area at the ideal state is 120, if the gray scale value of the film area is adjusted to 100, the coating area may be overexposed and cannot be detected. If the gray scale value of the coating area is adjusted to 120, the gray scale value of the film area is about 20, and thus the film area cannot be detected. In order to obtain a film area image and a coating image in an ideal state, a current method is using two image acquisition modules, in which each image acquisition module includes an image collector (for example, a CCD camera) and a light source, one image acquisition module being configured to acquire the film area image, and the other image acquisition module being configured to acquire the coating image.

FIG. 1 is a schematic structural diagram of a current electrode plate detection apparatus. As shown in FIG. 1, serial numbers 1 and 2 show a deviation correction roller for die-cutting deviation correction, serial numbers 3-6 show a substrate traveling belt roller, serial numbers 7-9 show a segment deviation correction roller, serial numbers 10-16 show a substrate traveling belt roller, serial number 17 shows a CCD camera at station A, serial number 18 shows a light source at station A, serial number 19 shows a CCD camera at station B, serial number 20 shows a light source at a station B, serial number 21 shows a CCD camera at station C, serial numbers 22 shows a light source at station C, and serial numbers 23 shows a CCD camera at station D, serial number 24 shows a light source at station D, serial number 25 shows a CCD camera at station E, serial number 26 shows a light source at station E, serial number 27 shows a CCD camera at station F, serial number 28 shows a light source at station F, and serial number 29 shows a laser head for cutting a tab, and serial number 30 shows a slitting knife. The serial number A is a station A for detecting the defect and measuring the size of a film area on a front surface of the electrode plate, the serial number B is a station B for detecting the defect and measuring the size of a coating area on the front surface of the electrode plate, the serial number C is a station C for detecting the defect and measuring the size of a coating area of a back surface of the electrode plate, and the serial number D is a station D for measuring the size and detecting the defect of a tab, the serial number E is a station E for detecting the defect and measuring the size of a film area of an upper segment of the back surface of the electrode plate, and the serial number F is a station F for detecting the defect and measuring the size of a film area of a lower segment of the back surface of the electrode plate.

It can be determined from FIG. 1 that when the defect detection and size measurement are performed on the film area and the coating area on the front surface of the electrode plate, two image acquisition modules at the station A and the station B are used, when the defect detection and size measurement are performed on the film area and the coating area on the back surface of the electrode plate, three image acquisition modules at the station C, the station E and the station F are used, and it can be determined therefrom that different image acquisition modules are required to detect the film area and the coating area on one surface of the electrode plate, so that the current electrode plate detection apparatus adopts a large number of image acquisition modules, thereby having high cost. It can be understood that, one of the two larger surfaces of the electrode plate is referred to as the front surface, and the other is referred to as the back surface.

In order to solve the described technical problem, the present application provides an electrode plate detection apparatus. The detection apparatus includes a detection module and a first image acquisition module, wherein the first image acquisition module can acquire images of different coating regions within a preset time period, the acquisition for the first time is configured to perform acquisition to obtain a first film area image, and the acquisition for another time is configured to perform acquisition to obtain a first coating image, so that the detection module detects the electrode plate according to the first film area image and the first coating image.

It can be understood that, in addition to the quality detection of the electrode plate, the embodiments of the present application may also be used for a scenario in which image acquisition needs to be performed on other objects including two different exposure degrees to obtain two types of images, which is not specifically limited by the embodiments of the present application.

Figure 2:
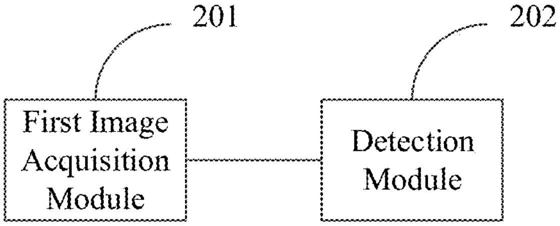
FIG. 2 is a schematic structural diagram of an electrode plate detection apparatus according to the embodiments of the present application.

FIG. 2 is a schematic structural diagram of an electrode plate detection apparatus according to the embodiments of the present application. As shown in FIG. 2, the apparatus includes a first image acquisition module 201 and a detection module 202, and the detection module 202 is in communication connection with the first image acquisition module 201. The first image acquisition module 201 is configured to acquire images of different coating regions on an electrode plate, and send the acquired images of the different coating regions to the detection module 202. The detection module 202 detects the electrode plate after receiving the images of the different coating regions.

The first image acquisition module 201 is provided at a position aligned with the electrode plate to be detected, and is configured to acquire the images of the different coating regions of the electrode plate. The coating areas refer to areas formed by coating an active material or an insulating material on a current collector (also referred to as an electrode plate substrate, which may specifically be aluminum foil or copper foil), wherein the active material may be a positive electrode material or a negative electrode material, and the insulating material may be a ceramic material or the like. The different coating regions refer to areas formed by coating different materials on the current collector, for example, the electrode plate may include a coating area coated with a positive electrode material and a coating area coated with an insulating material, and the coating area of the positive electrode material and the coating area of the insulating material are different coating regions. It can be understood that, the first image acquisition module may be a CCD camera with a light supplementing function, and may also be a combination of a CCD camera without a light supplementing function and a light source.

The detection module 202 may be understood as a device capable of implementing image processing, for example, a processor or a computer running an image processing algorithm, and the image processing algorithm is capable of detecting received images of different coating regions, so as to determine whether the images of the different coating regions meet the production requirement. The detection module 202 may be connected to the first image acquisition module 201 in a wired and/or wireless manner. It should be noted that, if the detection module 202 and the first image acquisition module 201 are in wireless communication, it indicates that both the detection module 202 and the first image acquisition module 201 have a wireless communication function.

The detection module 202 and the first image acquisition module 201 are in communication connection in a wired or wireless manner so as to implement online detection on the images of the different coating regions, thereby providing a basis for implementing online deviation correction in subsequent steps. In practical applications, the detection module 202 and the first image acquisition module 201 may also have another communication mode, that is, after acquiring the images of the different coating regions, the first image acquisition module 201 stores the images, and then an operator manually copies the images of the different coating regions from the first image acquisition module by using a storage device such as a USB disk, and transmits the images to the detection module 202. Although this manner may implement detection of the electrode plate, but online inspection cannot be implemented, and a function of online deviation correction cannot be provided for the subsequent steps.

In the embodiments of the present application, the first image acquisition module can be used to acquire the images of the different coating regions on the electrode plate, compared with the need to use different image acquisition modules for different coating regions in the prior art, the embodiments of the present application can reduce the number of image acquisition modules, thereby reducing the cost of the electrode plate detection apparatus.

On the basis of the described embodiments, the images of the different coating regions include a first film area image and a first coating image of the first surface of the electrode plate.

Figure 3:
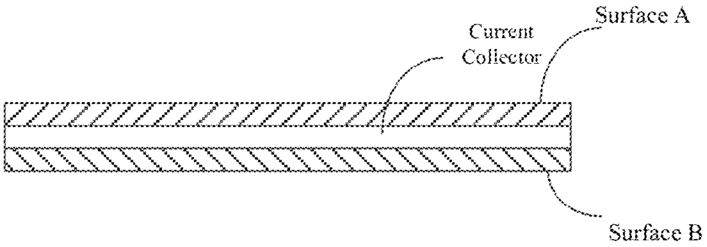
FIG. 3 is a schematic cross-sectional diagram of an electrode plate according to the embodiments of the present application.
Figure 4:
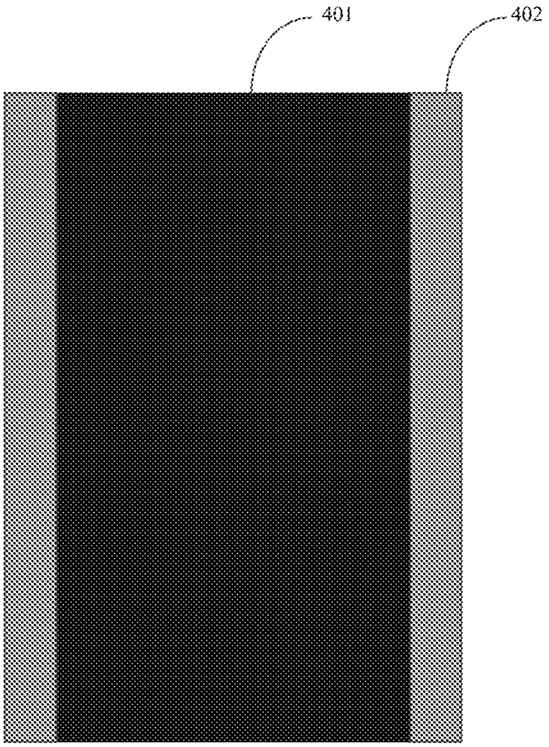
FIG. 4 is a schematic diagram of a first surface of an electrode plate according to the embodiments of the present application.

FIG. 3 is a schematic cross-sectional diagram of an electrode plate according to the embodiments of the present application. As shown in FIG. 3, the electrode plate includes two opposite surfaces in a thickness direction, that is, surface A and surface B in FIG. 3. In the embodiments of the present application, any surface of the electrode plate is referred to as the first surface, and the other surface is referred to as the second surface. In the embodiments of the present application, surface A may be referred to as the first surface, and surface B may be referred to as the second surface. FIG. 4 is a schematic diagram of the first surface of the electrode plate according to the embodiments of the present application. As shown in FIG. 4, the black area in the electrode plate is a first film area 401, and the gray area is a first coating area 402, wherein the first film area refers to an area formed by coating a current collector with an active material (for example, a positive electrode material or a negative electrode material), and the first coating area refers to an area formed by coating a current collector with an insulating material. When image acquisition is performed on the electrode plate, a first film area image corresponding to the first film area 401 and a first coating image corresponding to the first coating area 402 can be obtained.

In the embodiments of the present application, the first film area image and the first coating image of the first surface of the electrode plate can be obtained by means of one first image acquisition module, so that the number of image acquisition modules used in the electrode plate detection apparatus is relatively small, and the cost thereof is low.

On the basis of the described embodiments, the first image acquisition module acquires the first film area image and the first coating image of the first surface of the electrode plate by means of a time-division exposure method; and the time-division exposure method refers to performing image acquisition at different time points by using different exposure parameters.

In a specific implementation process, as the exposure parameters required by the first film area and the first coating area included in the first surface of the electrode plate are different, the first image acquisition module may implement image acquisition by means of time-division exposure. The time-division exposure means that the first image acquisition module performs exposure twice at different time points, the time interval between two times of exposure is short, the exposure parameter of the exposure for the first time matches the exposure parameter required when the imaging effect of the first coating area is good, and the exposure parameter of the exposure for another time matches the exposure parameter required when the imaging effect of the first coating area is good. Furthermore, the first image acquisition module respectively performs image acquisition on the first surface of the electrode plate during two times of exposure, so as to obtain the first film area image and the first coating image having a good imaging effect.

In the embodiments of the present application, the first image acquisition module acquires the first film area image and the first coating image by means of a time-division exposure method, thereby implementing image acquisition of a film area and a coating area on one of the surfaces of the electrode plate by using one image acquisition module, so that the number of image acquisition modules is reduced, thereby further reducing the cost of the electrode plate detection apparatus.

On the basis of the described embodiments, the apparatus further includes a second image acquisition module in communication connection with the detection module;

- the second image acquisition module also acquires a second film area image and a second coating image of the second surface of the electrode plate by means of a time-division exposure method, and sends the second film area image and the second coating image to the detection module; and
- after receiving the second film area image and the second coating image sent by the second image acquisition module, the detection module performs quality detection on the second surface of the electrode plate according to the second film area image and the second coating image.

The second image acquisition module may also be in communication connection with the detection module in a wired and/or wireless manner; and the second image acquisition module is provided at a position aligned with the second surface of the electrode plate to be detected, and is configured to acquire the images of the second surface of the electrode plate.

The second surface of the electrode plate includes a second film area and a second coating area, the second film area refers to an area formed by coating a current collector with an active material (for example, a positive electrode material or a negative electrode material), and the second coating area refers to an area formed by coating the current collector with an insulating material. As the materials corresponding to the second film area and the second coating area are different, the exposure intensities required by the second film area and the second coating area are different. The second image acquisition module may implement image acquisition by means of a time-division exposure method. The time-division exposure means that the second image acquisition module performs exposure twice in a short time, the exposure intensity of the exposure for the first time matches the exposure intensity required when the imaging effect of the second coating area is good, and the exposure intensity of the exposure for another time matches the exposure intensity required when the imaging effect of the second coating area is good. Furthermore, the second image acquisition module respectively acquires the images of the electrode plate during two times of exposure, so as to obtain the second film area image and the second coating image having a good imaging effect.

It can be understood that, the second image acquisition module may be a CCD camera with a light supplementing function, and may also be a combination of a CCD camera without a light supplementing function and a light source.

After acquiring the second film area image and the second coating image, the second image acquisition module sends the second film area image and the second coating image to the detection module; and the detection module runs an algorithm for detecting the film area and the coating area, so that the detection module can detect the received second film area image and second coating image, so as to obtain a detection result of the second surface of the electrode plate. It can be understood that, in the detection process, the size of the second film area and whether there is a defect in the second film area image may be detected, and the size of the second coating area and whether there is a defect in the second coating image may also be detected.

In the embodiments of the present application, the second image acquisition module can implement image acquisition of the film area and the coating area by means of time-division exposure, and therefore, image acquisition of the film areas and the coating areas on both surfaces of the electrode plate can be implemented by means of the first image acquisition module and the second image acquisition module, thereby reducing the cost of the electrode plate detection apparatus.

On the basis of the described embodiments, the apparatus further includes a third image acquisition module in communication connection with a detection module;

- the third image acquisition module is configured to acquire a tab image and send the tab image to the detection module; and
- after receiving the tab image, the detection module performs quality detection on a tab on the electrode plate according to the tab image.

In a specific implementation process, the third image acquisition module may also be in communication connection with the detection module in a wired and/or wireless manner. Furthermore, the third image acquisition module is provided at a position after the tab is obtained by performing die cutting on the electrode plate by means of a laser die-cutting apparatus, and can acquire the tab image. The tab is obtained by performing die cutting on the electrode plate by means of laser die-cutting. As the third image acquisition module is configured to acquire the tab image, the third image acquisition module only needs to perform exposure according to the exposure intensity required by the tab.

It can be understood that, the third image acquisition module may be a CCD camera with a light supplementing function, and may also be a combination of a CCD camera without a light supplementing function and a light source.

After acquiring the tab image, the third image acquisition module sends the tab image to the detection module, and the detection module also runs an image processing algorithm capable of detecting the tab image. After receiving the tab image, the detection module may detect the tab image by using the image processing algorithm, so as to obtain a detection result of the tab.

In the embodiments of the present application, the third image acquisition module is configured to perform image acquisition on the tab, so that it can be determined whether the size of the tab meets a requirement and whether the tab has a defect, thereby achieving quality detection of the electrode plate.

On the basis of the described embodiments, the first image acquisition module includes a first image collector and a first light source, the first light source performs exposure twice with different intensities according to a first exposure time and a first exposure time interval, and the first image collector performs image acquisition on the electrode plate during exposure of the first light source, so as to obtain the first film area image and the first coating image.

In a specific implementation process, the first light source is configured to provide illumination with different intensities, so that when light with different intensities is irradiated onto the first surface of the electrode plate, the first image collector performs image acquisition on the first surface of the electrode plate to obtain two images. It can be understood that the two images may both include the first film area and the first coating area. The difference lies in that, in the two images, the first film area in one image has a good imaging effect, and the first coating area in the other image has a good imaging effect. In the subsequent image processing, an image in which the first film area has a good imaging effect is selected as the first film area image, and an image in which the first coating area has a good imaging effect is selected as the first coating image. Of course, during image acquisition, when the exposure intensity of the first light source is adapted to the first film area, the first image collector may also only acquire an image of the first film area as the first film area image; and when the exposure intensity of the first light source is adapted to the first coating area, the first image collector may also only acquire an image of the first coating area as the first coating image.

The first image collector may be a CCD camera without a light supplementing function, and may also be a CCD camera with a light supplementing function. When the first image collector is the CCD camera with the light supplementing function, due to the existence of the first light source, the CCD camera does not use its own light supplementing function to perform light supplementing when performing image acquisition.

In order to use the same light source and the CCD camera to complete exposure and image acquisition at two brightness levels in a short time, the first light source performs exposure twice with different intensities according to the first exposure time and the first exposure time interval. The first exposure time is a time when the first light source emits light during the first light compensation process. The first exposure time interval refers to a time interval from end of first exposure to start of second exposure of the first light source within an image detection period.

It can be understood that, as the electrode plate is transferred by using a conveyor belt, in order to perform quality detection on each area of the electrode plate, a first image acquisition module may perform time-division exposure for the first time according to the image detection period. The image detection period may be determined according to a length of an electrode plate that can be acquired by the first image acquisition module in the image acquisition for the first time, and the transferring speed of the electrode plate. In some embodiments, images acquired in adjacent image detection periods do not overlap, while in other embodiments, images acquired in adjacent image detection periods have an overlapping area. The former solution can reduce the number of times of image acquisition and reduce power consumption; and the latter solution can reduce a detection missing rate of the electrode plate.

In the embodiments of the present application, the first light source performs time-division exposure, and the first image collector performs image acquisition each time the first light source performs exposure, so that the first film area image and the first coating image can be obtained. One image acquisition module is used to implement image acquisition of two areas, and the acquired images have a good imaging effect.

On the basis of the described embodiments, the first exposure time can be set to be shorter than a time for the first image collector to scan a line, and the first exposure time interval is determined according to a line frequency of a standard camera and a line frequency corresponding to the first image collector.

In a specific implementation process, the line frequency refers to the number of times that an electronic gun scans a screen from left to right per second, and is also referred to as a horizontal scanning frequency of the screen, which is in a unit of Hz. A larger line frequency means a higher resolution that a display can provide, and a better stability. Therefore, according to the line frequency of the first image collector, the time for the first image collector to scan a line can be calculated.

The method for calculating the line frequency of the first image collector is as follows:

assuming the known conditions: the production line speed V (mm/s), the range of the field of view FOV (mm), and the single-pixel precision A (mm);

(1) according to the known conditions, it can be calculated that the time t1 for a standard camera CCD to scan a line of a common solution=precision/production line speed=A/V (us);

(2) as in the time-division exposure solution in the embodiments of the present application, the first image collector needs to finish photographing twice within the time period when the CCD in the common solution scans a line, in the embodiments of the present application, the time t2 for the first image collector to scan a line should satisfy $t2 \leq t1/2 = A/V/2$ (us); and (3) according to the time for the first image collector to scan a line calculated in (2), it can be obtained that the line frequency of the first image collector should satisfy $T \geq 1/t2$ (Hz).

Thus, the first exposure time of the first light source should be shorter than the time for the first image collector to scan a line, i.e., the first exposure time $t3 < t2$, and the first exposure time interval $t4 < t1 - t2$.

In addition, in order to improve the effect of the first film area image and the first coating image that can be acquired, the resolution of the first image collector can meet the following requirement:

the calculation formula of the resolution Rd(pixel) of the camera is: resolution=the range of the field of view/detection precision=FOV/A.

On the basis of the described formula, the resolution of the first image collector should be set to be greater than or equal to FOV/A.

In addition, the first image collector may also use a large aperture lens, so as to further improve the effect of image acquisition.

In the embodiments of the present application, by setting the first exposure time and the first exposure time interval of the first image collector, the first image collector can complete the image acquisition of the film area and the coating area in a relatively short time.

The second image acquisition module includes at least one submodule, and each of the submodules is configured to acquire a second film area image and a second coating image of a corresponding segmented electrode plate.

In a specific implementation process, the submodule refers to a module configured to perform image acquisition on the second surface of the electrode plate. In the die-cutting process of the electrode plate, the die-cutting process may be a one-into-one mode, and may also be a one-into-N mode, where N is a positive integer greater than 1.

The second image acquisition module is configured to acquire the second film area image and the second coating image of the second surface of the electrode plate. If the die-cutting process is in a one-into-one mode, it indicates that the electrode plate is not segmented, and in this case, the second image acquisition module only needs to include one submodule. If the die-cutting process is in a one-into-N mode, it indicates that before the image acquisition is performed on the second surface of the electrode plate, the electrode plate is segmented into N segmented electrode plates by a slitting knife, and in order to acquire images of the segmented electrode plates, the second image acquisition module includes N submodules, each submodule corresponds to a segmented electrode plate, and image acquisition is performed on the second surfaces of the corresponding segmented electrode plates, so as to obtain corresponding second film area images and second coating images.

The electrode plate detection apparatus provided in the embodiments of the present application is applicable to a one-into-N scenario during segmentation of the electrode plate. Each submodule corresponds to one segmented electrode plate, so that film areas and coating areas of the second surfaces of all the segmented electrode plates can be detected.

On the basis of the described embodiments, each submodule includes a second image collector and a second light source, the second light source performs exposure twice with different intensities according to a second exposure time and a second exposure time interval, and the second image collector performs image acquisition on the electrode plate during the exposure of the second light source, so as to obtain the second film area image and second coating image of the corresponding segmented electrode plate.

In a specific implementation process, each submodule includes a second image collector and a second light source. The second light source is configured to provide light of two different intensities, so that when light of different intensities is irradiated onto the second surface of the electrode plate, the second image collector respectively acquires images of the second film area and the second coating area.

The second image collector may be a CCD camera without a light supplementing function, and may also be a CCD camera with a light supplementing function. When the second image collector is the CCD camera with the light supplementing function, due to the existence of the second light source, the CCD camera does not use its own light supplementing function to perform light supplementing when performing image acquisition.

In order to use the same light source and the CCD camera to complete exposure and image acquisition at two brightness levels in a short time, the second light source performs exposure twice with different intensities according to the second exposure time and the second exposure time interval. The second exposure time is the time when the second light source emits light during the first light supplementing process, and the second exposure time interval refers to the time interval from the end of the first exposure to the start of the second exposure when the second light source is within one image detection period.

It can be understood that, as the electrode plate is transferred by using the conveyor belt, in order to perform quality detection on each area of the electrode plate, a second image acquisition module may perform time-division exposure for the first time according to the image detection period. The image detection period may be determined according to a length of the electrode plate that can be acquired by the second image acquisition module in the second image acquisition, and the transferring speed of the electrode plate.

In the embodiments of the present application, each submodule acquires the images of the film area and the coating area of the second surface of the segmented electrode plate by means of a time-division exposure method, thereby reducing the number of submodules and reducing the cost of the electrode plate detection apparatus.

On the basis of the described embodiments, the second exposure time of the second light source is shorter than the time for the second image collector to scan a line, and the second exposure time interval is determined according to the line frequency of the standard camera and the line frequency corresponding to the second image collector.

In a specific implementation process, the calculation method of the second image collector is as follows:

assuming the known conditions: the production line speed V' (mm/s), the range of the field of view FOV' (mm), and the single-pixel precision A' (mm);

(1) according to the known conditions, it can be calculated that the time t1' for a standard camera CCD to scan a line of a common solution=precision/production line speed=A'/V'(us);

(2) as in the time-division exposure solution in the embodiments of the present application, the second image collector needs to finish photographing twice within the time period when the CCD in the common solution scans a line, in the embodiments of the present application, the time t2' for the second image collector to scan a line should satisfy t2' (t1'/2=A'/V'/2 (us); and (3) according to the time for the second image collector to scan a line calculated in (2), it can be obtained that the line frequency of the second image collector should satisfy $T' \geq 1/t2'$ (Hz).

Thus, the second exposure time of the second light source should be shorter than the time for the second image collector to scan a line, i.e. the second exposure time $t3' < t2'$, and the second exposure time interval $t4' < t1' - t2'$.

In addition, in order to improve the effect of the second film area image and the second coating image that can be acquired, the resolution of the second image collector can meet the following requirement:

The calculation formula of the resolution Rd (pixel) of the camera is: resolution=the range of the field of view/detection precision=FOV'/A'.

On the basis of the described formula, the resolution of the second image collector should be set to be greater than or equal to FOV'/A'.

In addition, the second image collector may also use a large aperture lens, so as to further improve the effect of image acquisition.

In the embodiments of the present application, by setting the second exposure time and the second exposure time interval, the second image collector can complete the acquisition of images of the film area and the coating area in a relatively short time.

On the basis of the described embodiments, the detection module is specifically configured to perform size measurement and defect detection on the first coating image and/or the second coating image respectively after receiving the first coating image and/or the second coating image.

In a specific implementation process, a coating defect detection model may be pre-configured in the detection module, and the model may be obtained by training, for example, a convolutional neural network or an adversarial network, specifically: a large number of training samples are acquired, and the training samples are coating sample images containing defects pre-downloaded from a network, or coating sample images obtained by acquiring coating areas having a defect by using a camera. It can be understood that, if the first coating area and the second coating area use the same coating material, the coating material used in the coating area corresponding to the coating sample image is the same as that used in the first coating area and the second coating area. If the coating materials used in the first coating area and the second coating area are different, it is necessary to train corresponding models for the first coating area and the second coating area, respectively. After the coating sample images are acquired, the defects of the coating sample images can be artificially marked, i.e. the positions of the defects are marked.

An initial network model is trained by using the marked coating sample images, and the optimized model tends to be stable by optimizing internal parameters in the initial network model, so as to obtain the trained coating defect detection model.

After receiving the first coating image, the detection module may input the first coating image into the coating defect detection model, the coating defect detection model may perform defect detection on the first coating image, and if the first coating image contains a defect, the defect is marked. Therefore, the detection module can determine whether the corresponding first coating area has a defect according to the first coating image, and if there is a defect, the position of the defect is marked.

By the same reasoning, after receiving the second coating image, the detection module may input the second coating image into the coating defect detection model, the coating defect detection model may perform defect detection on the second coating image, and if the second coating image contains a defect, the defect is marked. Therefore, the detection module can determine whether the corresponding second coating area has a defect according to the second coating image, and if there is a defect, the position of the defect is marked. The detection module stores a correlation between a pixel point in the first coating image and an actual physical length; after receiving the first coating image, the detection module determines the number of pixel points in the first coating image occupied by the first coating area, and the physical size of the first coating area can be determined according to the correlation between the pixel points and the actual physical length.

The method for determining the physical size of the second coating area is similar to the method for determining the physical size of the first coating area, which is not repeated herein.

In the embodiments of the present application, by performing defect detection on the first coating image and/or the second coating image, it is determined whether the first coating and/or the second coating have a defect.

On the basis of the described embodiments, the detection module is further configured to send a die-cutting deviation correction signal to a die-cutting deviation correction apparatus in a die-cutting process system if it is determined that there is a coating deviation according to the first coating size and/or the second coating size after the first coating size and the second coating size are obtained.

In a specific implementation process, coating deviation calculation logic is pre-stored in the detection module, and after receiving the first coating size and/or the second coating size, the detection module can determine the coating deviation by means of the following method.

Figure 5:
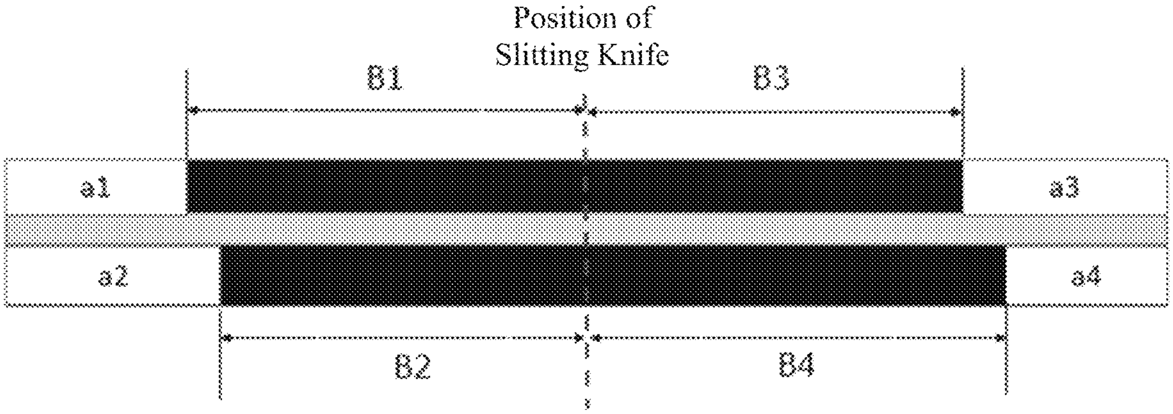
FIG. 5 is a schematic diagram of a cathode laser die-cutting and slitting integrated machine to segment an electrode plate according to the embodiments of the present application.

FIG. 5 is a schematic diagram of a cathode laser die-cutting and slitting integrated machine to segment an electrode plate according to the embodiments of the present application; as shown in FIG. 5, for the segmented electrode plates obtained after segmenting the electrode plate, the inner film width is B1, the inner coating width is a1, the outer film width is B3, and the outer coating width is a3; for the electrode plate after die-cutting and before slitting, the film width size is (B2+B4), the inner coating width is a2, and the outer coating width is a4.

During die-cutting deviation correction, the die-cutting deviation correction may be performed for one period according to a die-cutting sampling distance, wherein the die-cutting sampling distance means that the coating deviation is calculated once every sampling distance.

During die-cutting deviation correction, single-sided deviation correction or double-sided deviation correction may be performed, and the calculation logics of the two are different. Each deviation correction method is described as follows separately.

(1) For the single-sided deviation correction, the deviation correction logic thereof is: the inner coating width−the outer coating width of a surface of the electrode plate should tend to be 0.

Coating deviation correction is performed on the first surface of the electrode plate: the first image acquisition module acquires an inner coating width and an outer coating width of the first surface of the electrode plate (generally performing acquisition once every tab distance), and calculates a deviation value between the inner coating width and the outer coating width, wherein each time the electrode plate runs for a sampling distance, the first image acquisition module removes the maximum value and the minimum value of the deviation values acquired during this period, and calculates a mean value of the remaining deviation values; a coating deviation correction amount is equal to the mean value of the deviation values multiplied by a deviation correction coefficient; and when the coating deviation correction amount is greater than a deviation correction minimum value and less than a deviation correction maximum value, the die-cutting deviation correction signal is sent to the die-cutting deviation correction apparatus; and if the number of times that the deviation value is greater than the deviation correction maximum value is greater than a preset number, alarm and shutdown are triggered.

It can be understood that, the deviation correction method for the second surface of the electrode plate is similar to the described method, which is not described herein.

(2) For the double-sided deviation correction, the deviation correction logic thereof is: the result of (the inner coating width of the first surface+the inner coating width of the second surface)−(the outer coating width of the first surface+the outer coating width of the second surface) tends to be 0.

The first image acquisition module acquires the inner coating width and the outer coating width of the first surface of the electrode plate, the second image acquisition module acquires an inner coating width and an outer coating width of the second surface of the electrode plate (generally performing acquisition once every tab distance), and calculates a deviation value of (the inner coating width of the first surface+the inner coating width of the second surface)−(the outer coating width of the first surface+the outer coating width of the second surface), wherein each time the electrode plate runs for a sampling distance, the detection module removes the maximum value and the minimum value of the deviation values acquired during this period, and calculates a mean value of the remaining deviation values; a coating deviation correction amount is equal to the mean value of the deviation values multiplied by a deviation correction coefficient; and when the coating deviation correction amount is greater than a deviation correction minimum value and less than a deviation correction maximum value, the die-cutting deviation correction signal is sent to the die-cutting deviation correction apparatus; and if the number of times that the deviation value is greater than the deviation correction maximum value is greater than the preset number, alarm and shutdown are triggered.

It can be understood that, the deviation correction coefficient, the deviation correction minimum value, and the deviation correction maximum value are all preset. In addition, the deviation correction coefficients, the deviation correction minimum values and the deviation correction maximum values respectively corresponding to the single-sided coating deviation correction and the double-sided coating deviation correction may be the same or different, and may be set according to actual situations.

In the embodiments of the present application, if the detection module determines that there is a coating size deviation, the die-cutting deviation correction signal is sent to the die-cutting deviation correction apparatus, so that the size of the first coating area meets the requirement, so as to guarantee the quality of the electrode plate.

On the basis of the described embodiments, the detection module is further specifically configured to perform size measurement and defect detection on the first film area image and/or the second film area image respectively after receiving the first film area image and/or the second film area image, so as to obtain a first film area size corresponding to the first film area image and/or a second film area size corresponding to the second film area image and a defect position.

In a specific implementation process, the detection module stores a correlation between a pixel point in the first film area image and the actual physical length; after receiving the first film area image, the detection module determines the number of pixel points in the first film area image occupied by the first film area, and the physical size of the first film area can be determined according to the correlation between the pixel points and the actual physical length. It can be understood that, the unit of the physical size may be micron, millimeter, centimeter, and the like.

By the same reasoning, the detection module may also store a correlation between a pixel point in the second film area image and the actual physical length; after receiving the second film area image, the detection module determines the number of pixel points in the second film area image occupied by the second film area, and the physical size of the second film area can be determined according to the correlation between the pixel points and the actual physical length.

It can be understood that, the correlation between the pixel points and the actual physical length in the first film area image stored in the detection module can be determined in advance according to device parameters of the first image acquisition module and the distance between the first image acquisition module and the acquired electrode plate. In the embodiments of the present application, the first image acquisition module may also be calibrated in advance, that is, the first image acquisition module is used in advance to perform image acquisition on an object of a known size, so as to calibrate the actual physical length corresponding to one pixel on the acquired image. Then, image acquisition is performed on the first film area at the same working condition.

By the same reasoning, the correlation between the pixel points and the actual physical length in the second film area image stored in the detection module can be determined in advance according to device parameters of the second image acquisition module and the distance between the second image acquisition module and the acquired electrode plate. The second image acquisition module may also be calibrated in advance, that is, the second image acquisition module is used in advance to perform image acquisition on an object of a known size, so as to calibrate the actual physical length corresponding to one pixel on the acquired image. Then, image acquisition is performed on the second film area at the same working condition.

The detection module pre-stores a film area defect detection model, and after receiving the first film area image, the detection module uses the defect detection model to perform defect detection on the first film area image; and if the first film area contains a defect, the position of the defect is marked.

Similarly, after receiving the second film area image, the detection module uses the defect detection model to perform defect detection on the second film area image, and if the second film area contains a defect, the position of the defect is marked.

It can be understood that, the film area defect detection model is obtained by performing training using sample images with a film area defect in advance.

In the embodiments of the present application, the size of the first film area image and/or the second film area image is measured to determine whether the size of the first film area image and/or the second film area image meets the requirement.

On the basis of the described embodiments, after receiving the first film area size and the second film area size, the detection module may determine whether there is a film area deviation according to the first film area size and the second film area size, and if so, a slitting deviation correction signal can be sent to a slitting deviation correction apparatus in the die-cutting process system.

In a specific implementation process, the detection module pre-stores a slitting deviation correction logic algorithm, and after receiving the first film area size and the second film area size, the detection module uses the deviation correction logic algorithm to determine whether there is a film area deviation, and the specific method thereof is as follows:

Still referring to FIG. 3, the film area deviation logic algorithm is: the result of (the inner film width of the first surface+the inner film width of the second surface)−(the outer film width of the first surface+the outer film width of the second surface) tends to be 0.

The first image acquisition module acquires a first inner film area with and a first outer film area width of the first surface of the electrode plate, the second image acquisition module acquires a second inner film area width and a second outer side film area width of the second surface of the electrode plate, and calculates a deviation value of (the first inner film area width of the first surface+the second inner film area width of the second surface)−(the first outer film area width of the first surface+the second outer film area width of the second surface), wherein each time the electrode plate runs for a sampling distance, the detection module removes the maximum value and the minimum value of the deviation values acquired during this period, and calculates a mean value of the remaining deviation values; the film area deviation correction amount is equal to the mean value of the deviation values multiplied by a deviation correction coefficient; and when the film area deviation correction amount is greater than a deviation correction minimum value and less than a deviation correction maximum value, the slitting deviation correction signal is sent to the slitting deviation correction apparatus in the die-cutting process system; and if the number of times that the deviation value is greater than the deviation correction maximum value is greater than a preset number, alarm and shutdown are triggered.

In the embodiments of the present application, if the detection module determines that there is a film area size deviation, slitting deviation correction information is sent to the slitting deviation correction apparatus, so as to ensure that the film area size of the segmented electrode plate meets the requirement.

On the basis of the described embodiments, after receiving the tab image, the detection module performs tab size detection on the tab image, and/or performs defect detection on the tab to mark the tab defect.

In a specific implementation process, according to process requirements, after receiving the tab image, the detection module may only perform size measurement on the tab in the tab image, may also only perform defect detection on the tab image, and may also not only measure the size of the tab but also detect the tab defect.

During tab size measurement, the detection module stores a correlation between one pixel point in the tab image and the actual physical length; and after receiving the tab image, the detection module determines the number of pixel points occupied by the tab in the tab image, and can determine the size of the tab according to the correlation between the pixel points and the actual physical length.

During tab defect detection, the detection module performs defect detection on the tab image by means of a pre-stored tab defect detection model; and if the tab in the tab image contains a defect, the defect position is marked. It can be understood that, the tab defect detection model is obtained by performing training according to tab training images marked with tab defects.

The embodiments of the present application provide functions of measuring the size of the tab and identifying the tab defect.

Figure 6:
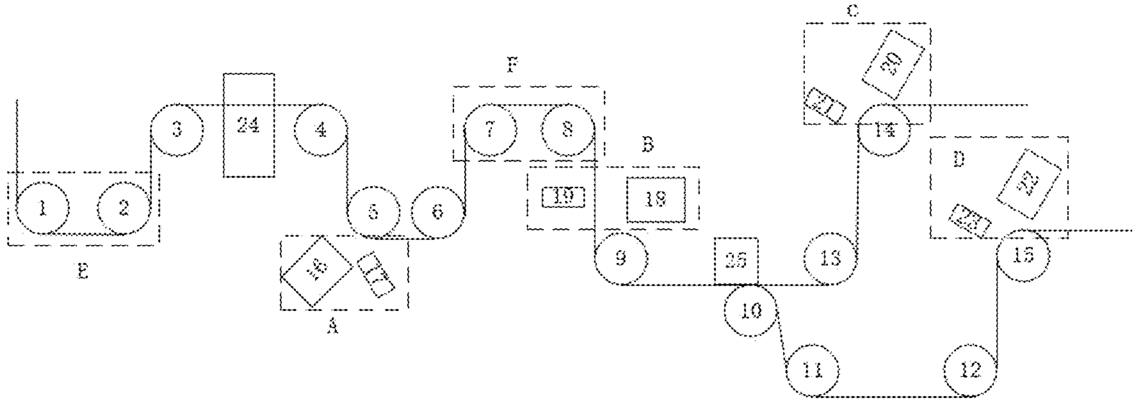
FIG. 6 is a schematic structural diagram of another electrode plate detection apparatus according to the embodiments of the present application.

FIG. 6 is a schematic structural diagram of another electrode plate detection apparatus according to the embodiments of the present application. As shown in FIG. 6, the apparatus includes a detection module (not shown in the figure), a first image acquisition module, a second image acquisition module, a third image acquisition module, and a fourth image acquisition module, wherein in FIG. 6, serial numbers 1 and 2 show a deviation correction roller for die-cutting deviation correction; serial numbers 3-6 show a substrate traveling belt roller; serial numbers 7-8 show a deviation correction roller for segment deviation correction; serial numbers 9-15 show a substrate traveling belt roller; serial number 16 shows a CCD camera at station A; serial number 17 shows a light source at station A; serial number 18 shows a CCD camera at station B; serial number 19 shows a light source at station B; serial number 20 shows a CCD camera at station C; serial numbers 21 shows a light source at station C; serial numbers 22 shows a CCD camera at station D; serial number 23 shows a light source at station D; serial number 24 shows a laser head, which is a tab forming apparatus; serial number 25 shows a slitting knife, which is an electrode plate segmentation apparatus; serial number A shows station A for detecting the defect and measuring the size of a film area and an AT11 area of a front surface of an electrode plate, and it can be understood that the film area and the AT11 area are different coating regions on the front surface of the electrode plate; serial number B shows station B for measuring the size and detecting the defect of a tab; serial number C shows station C for detecting the defect and measuring the size of a film area and an AT11 area of a back surface of an upper segmented electrode plate, and it can be understood that the film area and the AT11 area are different coating regions on the back surface of the electrode plate; serial number D shows station D for detecting the defect and measuring the size of a film area and an AT11 area of a back surface of a lower segmented electrode plate; serial number E shows a die-cutting deviation correction apparatus; and serial number F shows a slitting deviation correction apparatus.

Serial number 16 and serial number 17 constitute the first image acquisition module; serial number 18 and serial number 19 constitute the second image acquisition module; serial number 20 and serial number 21 constitute the third image acquisition module, and serial number 22 and serial number 23 constitute the fourth image acquisition module.

Compared with FIG. 1, the embodiments of the present application use only four image acquisition modules, while in FIG. 1, six image acquisition modules need to be used. Therefore, the electrode plate detection apparatus provided by the embodiments of the present application reduces the number of image acquisition modules, thereby reducing the cost of the electrode plate detection apparatus.

Figure 7:
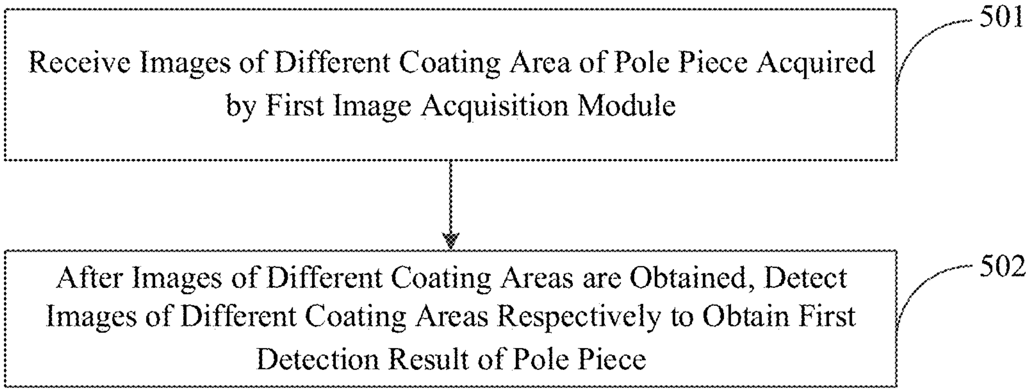
FIG. 7 is a schematic flowchart of an electrode plate quality detection method according to the embodiments of the present application.

FIG. 7 is a schematic flowchart of an electrode plate detection method according to the embodiments of the present application. As shown in FIG. 7, the method is applied to a detection module, and the detection module may be a processor or a computer. The method includes:

Step 501: receiving images of different coating regions of an electrode plate acquired by a first image acquisition module; and Step 502: after the images of different coating regions are obtained, detecting the images of the different coating regions respectively to obtain a first detection result of the electrode plate.

It can be understood that, for the relevant explanation of the images of the different coating regions, reference can be made to the described embodiments, which will not be repeated herein. In addition, when the detection module detects the images of the different coating regions, the corresponding size of each coating region can be measured and it can be determined whether there is a defect, so as to obtain the first detection result.

In the embodiments of the present application, as the first image acquisition module can acquire the images of the different coating regions on the electrode plate, and then detection is performed according to the acquired images of the different coating regions, so as to reduce the cost of electrode plate detection.

On the basis of the described embodiments, the received images of the different coating regions are obtained by the following method:

the detection module receives a first film area image and a first coating image of a first surface of the electrode plate acquired by the first image acquisition module by means of a time-division exposure method.

In a specific implementation process, the first image acquisition module performs image acquisition on the first surface of the electrode plate by means of a time-division exposure method, so as to obtain the first film area image and the first coating image. For a specific method for the first image acquisition module performing image acquisition by means of the time-division exposure method, reference may be made to the described embodiments, and details are not repeatedly described herein.

After receiving the first film area image and the first coating image, the detection module uses a pre-stored film area defect detection model to perform film area defect detection on the first film area image, and if a first film area contains a defect, the position of the defect is marked. The detection module uses a pre-stored coating defect detection model to perform coating defect detection on the first coating image, and if a first coating area contains a defect, the position of the defect is marked.

The detection module further includes a correlation between pixels in an image and the actual physical size; and according to the correlation, a first film area size can be determined according to the first film area image, and a first coating size can be determined according to the first coating image.

In the embodiments of the present application, the first image acquisition module acquires the first film area image and the first coating image by means of the time-division exposure method, thereby implementing image acquisition of the film area and the coating area on one of the surfaces of the electrode plate by using one image acquisition module, so that the number of image acquisition modules is reduced, thereby further reducing the cost of an electrode plate detection apparatus.

On the basis of the described embodiments, the detection module may further receive a second film area image and a second coating image of a second surface of the electrode plate acquired by a second image acquisition module, the second film area image and the second coating image being acquired by the second image acquisition module by means of a time-division exposure method; and performs size measurement and defect detection on the second film area image and the second coating image, so as to obtain a second detection result of the electrode plate.

In a specific implementation process, for the method for the detection module performing size measurement and defect detection on the second film area image, reference can be made to the method for the detection module performing detection on the first film area image, and for the specific method for the detection module performing size measurement and defect detection on the second coating image, reference can be made to the method for the detection module performing detection on the first coating image, which are not specifically limited in the embodiments of the present application.

In the embodiments of the present application, the second image acquisition module can implement image acquisition of a film area and a coating area by means of time-division exposure, and therefore, image acquisition of the film areas and the coating areas on both surfaces of the electrode plate can be implemented by means of the first image acquisition module and the second image acquisition module, thereby reducing the cost of the electrode plate detection apparatus.

On the basis of the described embodiments, the detection module may further receive a tab image acquired by a third image acquisition module, and perform tab size measurement and tab defect detection on the tab image, so as to obtain a third detection result of the electrode plate.

In a specific implementation process, after receiving the tab image, the detection module may perform defect detection on the tab image according to a pre-stored tab defect detection model, and if a tab contains a defect, the defect may be marked. Furthermore, the detection module pre-stores a correlation between pixels in the tab image and the actual physical size, and the size of the tab can be determined according to the tab image on the basis of the correlation.

In the embodiments of the present application, the third image acquisition module is configured to perform image acquisition on the tab, so that it can be determined whether the size of the tab meets the requirement and whether the tab has a defect, thereby achieving quality detection of the tab.

On the basis of the described embodiments, after the detection module obtains the first detection result and the second detection result of the electrode plate, the method further includes:

if the first detection result and the second detection result indicate that there is a coating size deviation, sending a die-cutting deviation correction signal to a die-cutting deviation correction apparatus in a die-cutting process system.

In a specific implementation process, the first detection result comprises includes the a first inner coating width and the a first outer coating width corresponding to the first surface of the electrode plate, and the second detection result comprises includes the a second inner coating width and the a second outer coating width corresponding to the second surface of the electrode plate. It can be understood that, the first inner coating width corresponding to the an inner coating width of the electrode plate after die-cutting in FIG. 5 is a2, the first outer coating width corresponding to the an outer coating width of the electrode plate after die-cutting in FIG. 5 is a4, the second inner coating width corresponding to the an inner coating width of the electrode plate after slitting in FIG. 5 is a1, and the second outer coating width corresponding to the an outer coating width of the electrode plate after slitting in FIG. 5 is a3.

Therefore, the detection module can determine whether there is a coating deviation according to the first detection result and the second detection result, and the determination method thereof can refer to the described embodiments, which will not be repeated herein. If there is a coating deviation, the detection module sends the die-cutting deviation correction signal to the die-cutting deviation correction apparatus in the die-cutting process system. The die-cutting deviation correction signal is configured to enable the die-cutting deviation correction apparatus to adjust the die-cutting position of a laser die-cutting rule according to the die-cutting deviation correction signal.

In the embodiments of the present application, the die-cutting deviation correction signal is sent to the die-cutting deviation correction apparatus, so that the size of the coating area meets the requirement, guaranteeing the quality of the electrode plate.

On the basis of the described embodiments, after the detection module obtains the first detection result and the second detection result of the electrode plate, the method further includes:

if the first detection result and the second detection result indicate that there is a film area size deviation, sending a slitting deviation correction signal to a slitting deviation correction apparatus in the die-cutting process system.

In a specific implementation process, the first detection result further includes a first inner film area width and a first outer film area width of the first surface of the electrode plate, and the second detection result includes a second inner film area width and a second outer film area width of the second surface of the electrode plate. Therefore, the detection module can determine whether there is a film area deviation according to the first detection result and the second detection result, and the determination method thereof can refer to the described embodiments, which will not be repeated herein. It can be understood that, the first inner film area width corresponding to an inner film width of the electrode plate after die-cutting in FIG. 5 is B2, the first outer film area width corresponding to an outer film width of the electrode plate after die-cutting in FIG. 5 is B4, the second inner film area width corresponding to an inner film width of the electrode plate after slitting in FIG. 5 is B1, and the second outer film area width corresponding to an outer film width of the electrode plate after slitting in FIG. 5 is B3.

If the detection module determines that there is a film area deviation, the slitting deviation correction signal is sent to the slitting deviation correction apparatus in the die-cutting process system. The slitting deviation correction signal is configured to enable the slitting deviation correction apparatus to adjust the slitting position of a slitting knife according to the slitting deviation correction signal.

In the embodiments of the present application, if the detection module determines that there is a film area size deviation, the slitting deviation correction signal is sent to the slitting deviation correction apparatus, so as to ensure that the size of the segmented electrode plates meets the requirement.

The embodiments of the present application further provide an electrode plate production system, the production system includes a die-cutting process system and an electrode plate detection apparatus, and the electrode plate detection apparatus can execute the method provided by the described embodiments.

Figure 8:
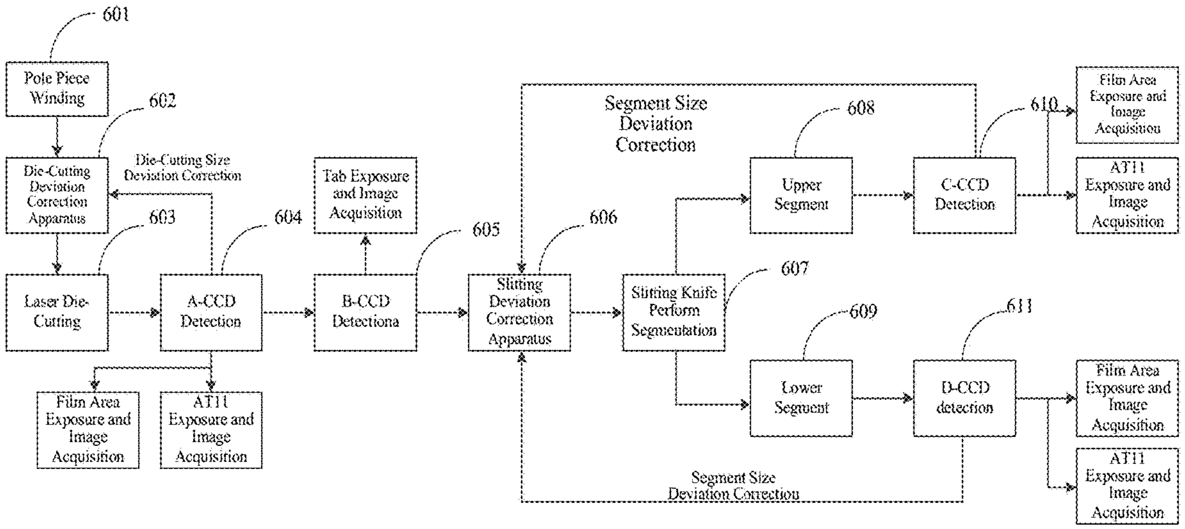
FIG. 8 is a working principle diagram of an electrode plate production system according to the embodiments of the present application.

FIG. 8 is a working principle diagram of an electrode plate production system according to the embodiments of the present application, as shown in FIG. 8, including:

Step 601, unwinding an electrode plate;

Step 602, a die-cutting deviation correction apparatus performing deviation correction according to a die-cutting deviation correction signal;

Step 603, laser die-cutting: performing laser die-cutting to obtain a tab;

Step 604, a first image acquisition module performing image acquisition to obtain a first film area image and a first coating image by means of a time-division exposure method;

Step 605, a second image acquisition module performing image acquisition to obtain a tab image;

Step 606, a slitting deviation correction apparatus performing deviation correction according to a slitting deviation correction signal;

Step 607, a slitting knife performing segmentation; the slitting knife segmenting the electrode plate to obtain segmented electrode plates, i.e. an upper segment and a lower segment, in which it can be understood that, after the electrode plate is segmented in the length direction, two segmented electrode plates are spatially one above and the other below, and the segmented electrode plate at an upper position is referred to as the upper segment, and the segmented electrode plate at a lower position is referred to the lower segment;

Step 608, obtaining the upper segment;

Step 609, obtaining the lower segment;

Step 610, a third image acquisition module performing image acquisition to obtain a second film area image and a second coating image of a second surface of the upper segment; and Step 611, a fourth image acquisition module performing image acquisition to obtain a second film area image and a second coating image of a second surface of the lower segment.

In the embodiments provided in the present application, it should be understood that the disclosed apparatus and method may be implemented in other manners. The apparatus embodiments described above are merely exemplary, for example, division of the described units is merely logical function division, and there may be other division manners in actual implementation, for instance, a plurality of units or components may be combined or integrated into another system, or some features may be ignored or not executed. In addition, the displayed or discussed mutual couplings or direct couplings or communication connections may be implemented by means of some communication interfaces, and the indirect couplings or communication connections among the apparatuses or units may be implemented in electrical and mechanical manners, or in other forms.

In addition, the units described as separate parts may or may not be physically separate, and parts displayed as units may or may not be physical units, i.e. may be located in one position, or may be distributed on a plurality of network units. Some or all of the units may be selected according to actual requirements to achieve the purposes of the solutions of the embodiments.

Moreover, the function modules in the embodiments of the present application may be integrated to form an independent part, or each module may exist separately, or two or more modules may be integrated to form an independent part.

In this document, relational terms such as first and second are merely used to distinguish one entity or operation from another entity or operation, and do not necessarily require or imply any actual relationship or order between these entities or operations.

The descriptions are merely embodiments of the present application, but are not intended to limit the scope of protection of the present application. For those skilled in the art, the present application may have various modifications and variations. Any modifications, equivalent replacements, improvements and the like made within the spirit and principle of the present application shall belong to the scope of protection of the present application.

What is claimed is:

1. An electrode plate detection apparatus, comprising an image processing device and a first image acquisition device, wherein the first image acquisition device is configured to acquire images of different coating regions on an electrode plate, and send the images of the different coating regions to the image processing device, wherein the images of the different coating regions comprise a first film area image and a first coating image of a first surface of the electrode plate; and the image processing device is configured to detect the electrode plate according to the images of the different coating regions;

wherein the first image acquisition device comprises a first image collector and a first light source;

the first light source is configured to perform exposure twice with different light intensities according to a first exposure time and a first exposure time interval; and the first image collector is configured to perform image acquisition on the electrode plate during the exposures of the first light source, so as to obtain the first film area image and the first coating image.

2. The apparatus according to claim 1, wherein the first image acquisition device acquires the first film area image and the first coating image of the first surface of the electrode plate by means of a time-division exposure method; and wherein the time-division exposure method comprises performing image acquisition at different time points by using different exposure parameters.

3. The apparatus according to claim 1, further comprising:

a second image acquisition device in communication connection with the image processing device;

wherein the second image acquisition device is configured to acquire a second film area image and a second coating image of a second surface of the electrode plate by means of a time-division exposure method, and sends the second film area image and the second coating image to the image processing device; and wherein the image processing device is further configured to detect the second surface of the electrode plate according to the second film area image and the second coating image.

4. The apparatus according to claim 1, further comprising:

a third image acquisition device in communication connection with the image processing device;

wherein the third image acquisition device is configured to acquire a tab image, and send the tab image to the image processing device; and wherein the image processing device is further configured to perform quality detection on a tab on the electrode plate according to the tab image.

5. The apparatus according to claim 1, wherein the first exposure time is shorter than a time for the first image collector to scan a line, and the first exposure time interval is determined according to a line frequency of a standard camera and a line frequency corresponding to the first image collector.

6. The apparatus according to claim 3, wherein the second image acquisition device comprises one or more image acquisition circuits, and each of the image acquisition circuits is configured to acquire a second film area image and a second coating image of a corresponding segmented electrode plate.

7. The apparatus according to claim 6, wherein each of the image acquisition circuits comprises a second image collector and a second light source;

the second light source is configured to perform exposure twice with different light intensities according to a second exposure time and a second exposure time interval; and the second image collector is configured to perform image acquisition on the electrode plate during the exposures of the second light source, so as to obtain the second film area image and the second coating image of the corresponding segmented electrode plate.

8. The apparatus according to claim 7, wherein the second exposure time is shorter than a time for the second image collector to scan a line, and the second exposure time interval is determined according to a line frequency of a standard camera and a line frequency corresponding to the second image collector.

9. The apparatus according to claim 3, wherein the image processing device is further configured to perform size measurement and defect detection on the first coating image and/or the second coating image respectively after receiving the first coating image and/or the second coating image.

10. The apparatus according to claim 9, wherein the image processing device is further configured to send a die-cutting deviation correction signal to a die-cutting deviation correction apparatus in a die-cutting process system under a condition that it is determined that there is a coating deviation according to a first coating size and/or a second coating size.

11. The apparatus according to claim 3, wherein the image processing device is further configured to perform size measurement and defect detection on the first film area image and/or the second film area image respectively after receiving the first film area image and/or the second film area image, so as to obtain a first film area size corresponding to the first film area image and/or a second film area size corresponding to the second film area image and a defect position.

12. The apparatus according to claim 11, wherein the image processing device is further configured to send a slitting deviation correction signal to a slitting deviation correction apparatus in a die-cutting process system when determining that there is a film area deviation according to the first film area size and the second film area size.

13. The apparatus according to claim 4, wherein the image processing device is further configured to perform tab size measurement on the tab image after receiving the tab image, and/or detect a tab defect to mark the tab defect.

14. An electrode plate detection method, applied to an electrode plate detection apparatus that comprises the image processing device and a first image acquisition device, the method comprising:

receiving, by the image processing device, images of different coating regions of an electrode plate acquired by the first image acquisition device, wherein the images of the different coating regions comprise a first film area image and a first coating image of a first surface of the electrode plate; and detecting, by the image processing device, the images of the different coating regions to obtain a first detection result of the electrode plate;

wherein the first image acquisition device comprises a first image collector and a first light source, and acquiring images of different coating regions of the electrode plate comprises:

performing, by the first light source, exposure twice with different light intensities according to a first exposure time and a first exposure time interval; and acquiring, by the first image collector, the first film area image and the first coating image during the exposures of the first light source.

15. The method according to claim 14, wherein receiving images of different coating regions of the electrode plate acquired by the first image acquisition device comprises:

receiving a first film area image and a first coating image of a first surface of the electrode plate acquired by the first image acquisition device by means of a time-division exposure method.

16. The method according to claim 14, wherein the electrode plate detection apparatus further comprises a second image acquisition device, and the method further comprises:

receiving a second film area image and a second coating image of a second surface of the electrode plate acquired by the second image acquisition device, the second film area image and the second coating image being acquired by the second image acquisition device by means of a time-division exposure method; and performing size measurement and defect detection on the second film area image and the second coating image, so as to obtain a second detection result of the electrode plate.

17. The method according to claim 14, wherein the electrode plate detection apparatus further comprises a third image acquisition device, and the method further comprises:

receiving a tab image acquired by the third image acquisition device; and performing tab size measurement and tab defect detection on the tab image, so as to obtain a third detection result of the electrode plate.

18. The method according to claim 16, wherein after obtaining the first detection result and the second detection result of the electrode plate, the method further comprises:

under a condition that the first detection result and the second detection result represent that there is a coating size deviation, sending a die-cutting deviation correction signal to a die-cutting deviation correction apparatus in a die-cutting process system.

* * * * *